(12) United States Patent
Zander et al.

(10) Patent No.: US 11,581,934 B2
(45) Date of Patent: Feb. 14, 2023

(54) METHODS FOR BEAM CORRESPONDENCE SIGNALING, RELATED WIRELESS DEVICES AND RELATED NETWORK NODES

(71) Applicant: Sony Group Corporation, Tokyo (JP)

(72) Inventors: Olof Zander, Lund (SE); Fredrik Rusek, Eslöv (SE); Kun Zhao, Malmö (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/427,649

(22) PCT Filed: Jan. 28, 2020

(86) PCT No.: PCT/SE2020/050069
§ 371 (c)(1),
(2) Date: Aug. 1, 2021

(87) PCT Pub. No.: WO2020/167201
PCT Pub. Date: Aug. 20, 2020

(65) Prior Publication Data
US 2022/0103215 A1    Mar. 31, 2022

(30) Foreign Application Priority Data

Feb. 14, 2019  (SE) .................................. 1950174-1

(51) Int. Cl.
*H04L 1/02*      (2006.01)
*H04B 7/06*      (2006.01)
(Continued)

(52) U.S. Cl.
CPC .......... *H04B 7/063* (2013.01); *H04B 7/0404* (2013.01); *H04B 7/0617* (2013.01);
(Continued)

(58) Field of Classification Search
CPC .... H04B 7/0617; H04B 7/0695; H04B 7/088; H04B 7/0874; H04B 7/0413;
(Continued)

(56) References Cited

U.S. PATENT DOCUMENTS

2020/0106168 A1*  4/2020  Hakola ................. G06F 1/1698
2021/0167821 A1*  6/2021  Chen .................... H04B 7/0408
(Continued)

FOREIGN PATENT DOCUMENTS

WO     2018144844 A1    8/2018

OTHER PUBLICATIONS

Swedish Search Report from corresponding Swedish Application No. 1950174-1, dated Oct. 18, 2019, 3 pages.
(Continued)

*Primary Examiner* — Khai Tran
(74) *Attorney, Agent, or Firm* — Tucker Ellis LLP (57) ABSTRACT

The present disclosure provides a method performed by a wireless device, for beam correspondence signalling. The wireless device comprises a plurality of antenna panels including a first antenna panel. The method comprises obtaining, for the first antenna panel, a first beam correspondence, BC, capability parameter associated with a first panel identifier. The method comprises transmitting to a network node a first BC capability indicator. The first BC capability indicator comprises the first BC capability parameter and the first panel identifier.

10 Claims, 5 Drawing Sheets

(51) Int. Cl.
  *H04B 7/0404*   (2017.01)
  *H04B 7/08*    (2006.01)
  *H04B 7/0413*   (2017.01)

(52) U.S. Cl.
  CPC ......... *H04B 7/0691* (2013.01); *H04B 7/0695* (2013.01); *H04B 7/088* (2013.01); *H04B 7/0413* (2013.01)

(58) Field of Classification Search
  CPC ... H04L 5/0023; H04L 5/0048; H04L 1/1854; H04L 5/0091; H04W 16/28; H04W 52/146; H04W 52/365; H04W 24/10; H04W 72/1268; H04W 72/042; H04W 72/0413
  USPC .......................................... 375/267, 260, 262
  See application file for complete search history.

(56) References Cited

U.S. PATENT DOCUMENTS

2021/0336737 A1* 10/2021 Li ........................ H04B 17/318
2022/0094415 A1*  3/2022 Hakola ................ H04B 7/0404

OTHER PUBLICATIONS

Intel Corporation, "On Beam Correspondence," 3GPP TSG-RAN WG1 #88; R1-1702198, Feb. 13-17, 2017, 3 pages.
LG Electronics, "Updated feature lead summary of Enhancement on Multi-beam Operations," 3GPP TSG-RAN WG1 Meeting #95, R1-1814122, Nov. 12-16, 2018, 26 pages.
CATT, "Enhancement on multi-beam operation," 3GPP TSG-RAN WG1 Meeting #95, R1-1812636, Nov. 12-16, 2018, 9 pages.
Sony et al., "Beam Correspondence, remaining X and Y," 3GPP TSG-RAN WG4 Meeting #90, R4-1901315, Feb. 25-Mar. 1, 2019, 7 pages.
International Search Report and Written Opinion from corresponding International Application No. PCT/SE2020/050069, dated Jul. 1, 2020, 16 pages.
ZTE, "Enhancement on multi-beam operation," 3GPP TSG-RAN WG1 Meeting #96, R1-1901635, Feb. 25-Mar. 1, 2019,18 pages.
ZTE, "Enhancement on multi-beam operation," 3GPP TSG-RAN WG1 Meeting #96bis, R1-1904014, Apr. 8-12, 2019, 17 pages.
ZTE, "Enhancement on multi-beam operation," 3GPP TSG-RAN WG1 Meeting #97, R1-1906237, May 13-17, 2019, 18 pages.

* cited by examiner

METHODS FOR BEAM CORRESPONDENCE SIGNALING, RELATED WIRELESS DEVICES AND RELATED NETWORK NODES

The present disclosure pertains to the field of wireless communications. More specifically, the present disclosure relates to methods for beam correspondence signaling, related wireless and devices and related network nodes.

BACKGROUND

Beam correspondence is mandatory with the capability signaling to indicate whether uplink beam sweeping is needed. Currently, the Beam correspondence, BC, signaling is defined for each wireless device (e.g. user equipment, UE) regardless of antenna features of the wireless device.

For example, a wireless device may be equipped with a plurality of antenna elements or antenna panels, which may lead to various antenna features.

For example, the BC capability of the wireless device may depend on the worst antenna panel (e.g. the antenna panel with the poorest performance) in order to guarantee the reliability of the communication system. This may however lead to an increase in uplink beam sweeping unnecessarily.

SUMMARY

There is a need for further optimization of the beam correspondence signaling. Accordingly, there is a need for methods for beam correspondence signalling, which mitigate, alleviate or address the shortcomings mentioned above and provide an improvement of the beam correspondence signaling by exploiting antenna features. For example, the wireless device may comprise a plurality of antenna panels and different antenna panels may have the different capability on beam correspondence in practice. Therefore, this disclosure improves the beam correspondence signaling by providing beam correspondence information per antenna panel.

The present disclosure provides a method performed by a wireless device for beam correspondence signalling. The wireless device comprises a plurality of antenna panels including a first antenna panel. The method comprises obtaining, for the first antenna panel, a first beam correspondence, BC, capability parameter associated with a first panel identifier. The method comprises transmitting to a network node a first BC capability indicator. The first BC capability indicator comprises the first BC capability parameter and the first panel identifier.

Further, a wireless device is provided, the wireless device comprising: an interface module, a memory module, and a processing module, wherein the wireless device is configured to perform any of the methods described herein.

The present disclosure provides a method performed by a network node, for beam correspondence signalling, wherein the network node is configured to communicate with a wireless device via a wireless communication system. The method comprises receiving a beam correspondence, BC, capability indicator from the wireless device, the BC capability indicator comprising a BC capability parameter and a panel identifier, wherein the panel identifier is configured to identify an antenna panel of a plurality of antenna panels of the wireless device, wherein the BC capability parameter is indicative of a beam correspondence capability for the antenna panel identified by the panel identifier. The method comprises determining, based on the BC capability indica-tor, if a per-panel beam correspondence signalling is supported by the wireless device.

Finally, a network node is provided, the network node comprising: an interface module, a memory module, and a processing module, wherein the wireless device is configured to perform any of the methods described herein.

It is an advantage of the present disclosure that the beam correspondence capability is enriched by exploiting antenna features and by providing from the wireless device to the network node the beam correspondence capability per antenna panel of the wireless device. The disclosed beam correspondence signalling is advantageous in that it permits the network node to make improved decisions on the transmission strategy.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The 3$^{rd}$ Generation Partnership Project, 3GPP, systems, beam correspondence is mandatory with the capability signaling definition as follows. For example, a UE or wireless device that fulfills the beam correspondence requirement without the uplink beam sweeping is to set the BC capability bit to 1. For example, a UE or wireless device that fulfills the beam correspondence requirement with the uplink beam sweeping is to set the BC capability bit to 0.

The Beam correspondence, BC, signaling has been defined per wireless device per frequency band; regardless if there are multiple panels or not in the wireless device.

However, in a practical scenario, different antenna panels within a wireless device may have different capability regarding beam correspondence. Since there is no BC signaling defined individually per antenna panel, the BC capability of the wireless device may depend on the worst antenna panel (e.g. the antenna panel with the poorest performance) in order to guarantee the reliability of the communication system. Therefore, the network node may request uplink, UL, beam sweeping because the BC capability has been set based on the worst antenna panel. An increased number of wireless devices performing the uplink beam sweeping procedure is likely to result in an increase in the uplink overhead and latency time, and in consumption of more network resources.

Moreover, for UL multiple input multiple output MIMO transmissions with a plurality of antenna panels, it may happen that not all the antenna panels can support BC with the selected BC capability setting.

The present disclosure proposes in one or more embodiment to indicate BC capability signaling per antenna panel instead of per UE, e.g. per antenna panel per frequency band. The BC capability signaling disclosed herein includes information identifying the corresponding antenna panel in the wireless device (e.g. a panel identifier).

A panel identifier as disclosed herein refers to an identifier which identifies an antenna panel, and/or an antenna sub-panel. A panel identifier may be seen a parameter establishing the identity of an antenna panel amongst the plurality of antenna panels of the wireless device. A panel identifier may be used by the network node to identify a group of antenna arrays, e.g. radiating elements.

The figures are schematic and simplified for clarity, and they merely show details which are essential to the understanding of the invention, while other details have been left out. Throughout, the same reference numerals are used for identical or corresponding parts.

Figure 1:
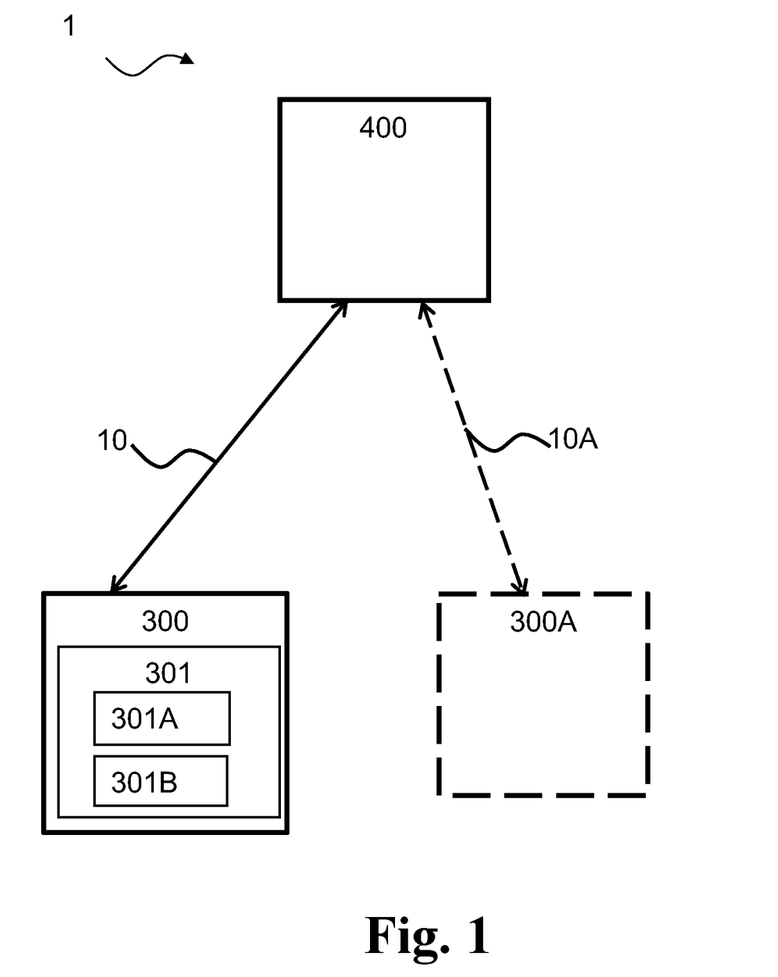
FIG. 1 is a diagram illustrating an exemplary wireless communication system comprising an exemplary network node and an exemplary wireless device according to this disclosure.

FIG. 1 is a diagram illustrating an exemplary wireless communication system 1 comprising an exemplary network node 400 and an exemplary wireless device 300 according to this disclosure.

As discussed in detail herein, the present disclosure relates to a wireless communication system 1 comprising a cellular system, e.g. a 3GPP wireless communication system. The wireless communication system 1 comprises a wireless device 300 and/or a network node 400. The wireless device 300 is configured to communicate with a network of the wireless communication system 1 via a network node 400.

A network node disclosed herein refers to a radio network node, such as a radio access network node operating in the radio access network, such as a base station, an evolved Node B, eNB, gNB. The network node may comprise a transmission reception point, TRP. In one or more embodiment, the network node may comprise a plurality of TRPs.

The wireless communication system 1 described herein may comprise one or more wireless devices 300, 300A, and/or one or more network nodes 400, such as one or more of: a base station, an eNB, a gNB and/or an access point.

A network node may refer to an entity of a wireless network of the wireless communication system, used for establishing and controlling an air interface for communication with one or more wireless devices.

A wireless device may refer to as one or more of: a mobile device, a mobile or stationary computer, a tablet, a smart wearable device, and a smart phone device. In specifications under 3GPP, a wireless device is generally referred to as a user equipment, UE.

The wireless device 300, 300A may be configured to communicate with the network node 400 via a wireless link (or radio access link) 10, 10A. The wireless device 300 comprises a plurality of antenna panels 301A, 301B including a first antenna panel 301A and optionally a second antenna panel 301B. The wireless device 300 comprises a wireless interface 301 comprising the plurality of antenna panels 301A, 301B.

An antenna panel may comprise one or more antenna arrays, e.g. one or more antenna elements.

For example, the first antenna panel 301A and the second antenna panel 301B may be arranged spaced apart in the wireless device.

It may be envisaged that two or more antenna panels form an antenna arrangement.

In one or more example embodiments, the first antenna panel 301A is configured to receive and/or transmit radio signals in a first direction via a first beam, whereas the second antenna panel is configured to receive and/or transmit radio signals in a second direction via a second beam. The wireless device 300 is thereby configured to communicate with the network node using spatial diversity and/or transmit/receive diversity.

Figure 2:
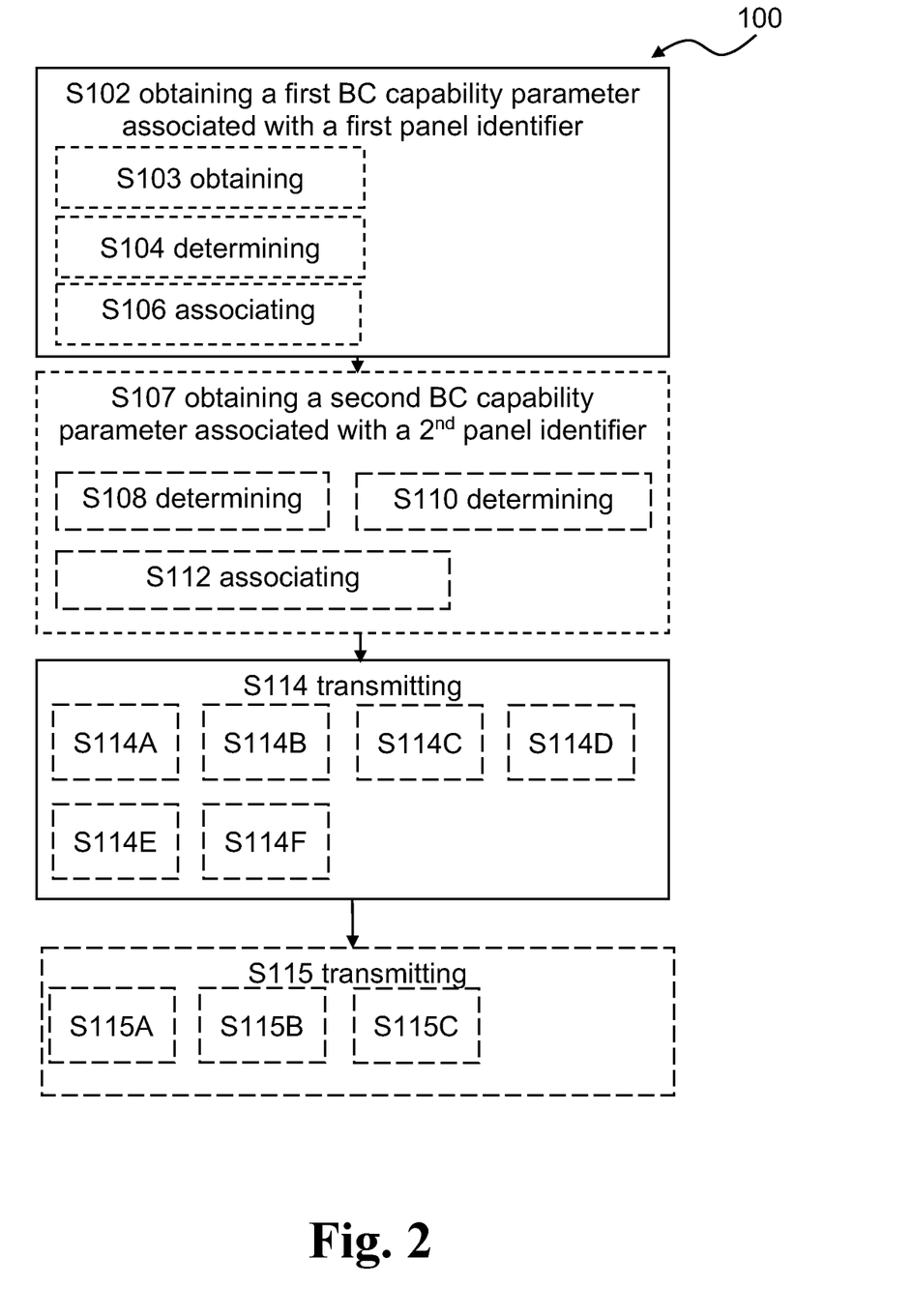
FIG. 2 is a flow-chart illustrating an exemplary method, performed in a wireless device, for beam correspondence signalling with a network node of a wireless communication system according to this disclosure.

FIG. 2 shows a flow diagram of an example method 100, performed by a wireless device, according to the disclosure.

The method 100 is performed by a wireless device for beam correspondence signalling.

The wireless device comprises a plurality of antenna panels including a first antenna panel.

The method 100 comprises obtaining S102 for the first antenna panel, a first beam correspondence, BC, capability parameter associated with a first panel identifier. A BC capability parameter is a parameter indicative of the BC capability related to an antenna panel in the present disclosure. For example, a wireless that fulfils the beam correspondence requirement without the uplink beam sweeping is to set the BC capability parameter to 1. For example, a wireless that fulfils the beam correspondence requirement with the uplink beam sweeping is to set the BC capability parameter to 0.

The method 100 comprises transmitting S114 to a network node a first BC capability indicator. The first BC capability indicator may comprise the first BC capability parameter and the first panel identifier (e.g. the first BC capability parameter associated with the corresponding first panel identifier).

The method 100 may be seen as avoiding unnecessary uplink overhead and latency time and network resources, which may be wasted when the panel identifier are not associated with the BC signalling, and BC signalling is performed per wireless device. This disclosure may advantageously lead in one or more embodiments to enhancing the use of BC when antenna panels are present as different antenna panels within a UE may have different capability regarding beam correspondence.

In one or more example methods, obtaining S102, for the first antenna panel, the first beam correspondence, BC, capability parameter associated with the first panel identifier comprises obtaining S103 the first panel identifier for the first antenna panel. In one or more example methods, obtaining S102, for the first antenna panel, the first beam correspondence, BC, capability parameter associated with the first panel identifier comprises determining S104 the first beam correspondence, BC, capability parameter for the first antenna panel. In one or more example methods, obtaining S102, for the first antenna panel, the first beam correspondence, BC, capability parameter associated with the first panel identifier comprises associating S106 the first BC capability parameter with the first panel identifier.

In one or more example methods, the plurality of antenna panels includes a second antenna panel. For example, the method 100 may comprise obtaining S107 for the second antenna panel, a second beam correspondence, BC, capability parameter associated with a second panel identifier. Obtaining S107 for the second antenna panel, a second beam correspondence, BC, capability parameter associated with a second panel identifier may comprise determining a panel identifier for each antenna panel of the plurality of antenna panels, determining S108 a second panel identifier for the second antenna panel, determining S110 a second beam correspondence, BC, capability parameter for the second antenna panel, and associating S112 the second BC capability parameter with the second panel identifier. In one or more example methods as described herein, the method 100 comprises transmitting S115 to a network node a second BC capability indicator. The second BC capability indicator may comprise the second BC capability parameter and the second panel identifier (e.g. the second BC capability parameter associated with the corresponding second panel identifier).

For example, the method 100 may comprise determining a beam correspondence, BC, capability parameter for each antenna panel of the plurality of antenna panels of the wireless device. For example, the method may comprise associating, for each antenna panel, the BC capability parameter with the corresponding panel identifier.

In one or more example methods, the first BC capability indicator comprises the first BC capability parameter associated with the corresponding first panel identifier.

In one or more example methods, the second BC capability indicator comprises the second BC capability parameter and the second panel identifier.

In one or more example methods, transmitting S114 the first BC capability indicator to the network node comprises determining S114A one or more panel capabilities for one or more of the first panel. In one or more example methods, transmitting S114 the first BC capability indicator to the network node comprises encoding S114B, for the first panel, the corresponding BC capability indicator with the corresponding one or more other panel capabilities. In one or more example methods, transmitting S114 the first BC capability indicator to the network node comprises transmitting S114C the encoded corresponding BC capability indicator to the network node. For example, the first BC capability indicator can be encoded together with other panel capabilities, e.g., if MIMO can be supported, and transmitted to the network node through SRS resources. For example, encoding S114B the corresponding BC capability indicator with the corresponding one or more panel capabilities comprises compressing the corresponding BC capability indicator with the corresponding one or more other panel capabilities.

In one or more example methods, transmitting S115 the second BC capability indicator to the network node comprises determining S115A one or more other panel capabilities for the second panel. In one or more example methods, transmitting S115 the second BC capability indicator to the network node comprises encoding S115B, for the second panel, the corresponding BC capability indicator with the corresponding one or more other panel capabilities. In one or more example methods, transmitting S115 the second BC capability indicator to the network node comprises transmitting S115C the encoded corresponding BC capability indicator to the network node. For example, the second BC capability indicator can be encoded together with other panel capabilities, e.g., if MIMO can be supported, and transmitted to the network node through SRS resources. For example, encoding S115B the corresponding BC capability indicator with the corresponding one or more panel capabilities comprises compressing the corresponding BC capability indicator with the corresponding one or more other panel capabilities.

In one or more example methods, transmitting S114 to the network node the first BC capability indicator comprises assigning S114D the first BC capability parameter to a first part of the first BC capability indicator and the first panel identifier to a second part of the first BC capability indicator. In one or more example methods, transmitting S114 to the network node the first BC capability indicator comprises transmitting S114E to the network node the first BC capability parameter comprising the first part and the second part. For example, a multiple bits of the first BC capability indicator can be assigned, where the first bit indicates the BC capability and the rest bits can be associated with the panel identifier.

In one or more example methods, transmitting S115 to the network node the second BC capability indicator comprises assigning the second BC capability parameter to a first part of the second BC capability indicator and the second panel identifier to a second part of the second BC capability indicator, and transmitting to the network node the second BC capability parameter comprising the first part and the second part. For example, a multiple bits of the second BC capability indicator can be assigned, where the first bit indicates the BC capability and the rest bits can be associated with the panel identifier.

In one or more example methods, the one or more panel capabilities comprise a multiple input multiple output, MIMO capability indicating whether MIMO is supported (e.g. by the wireless device).

In one or more example methods, transmitting S114 to the network node the first BC capability indicator comprises transmitting S114F to the network node the first BC capability indicator through one or more resources for reference signals.

In one or more example methods, transmitting S115 to the network node the second BC capability indicator comprises transmitting to the network node the second BC capability indicator through one or more resources for reference signals.

In one or more example methods, one or more resources for reference signals comprise one or more resources for sounding reference signals, SRS.

Figure 3:
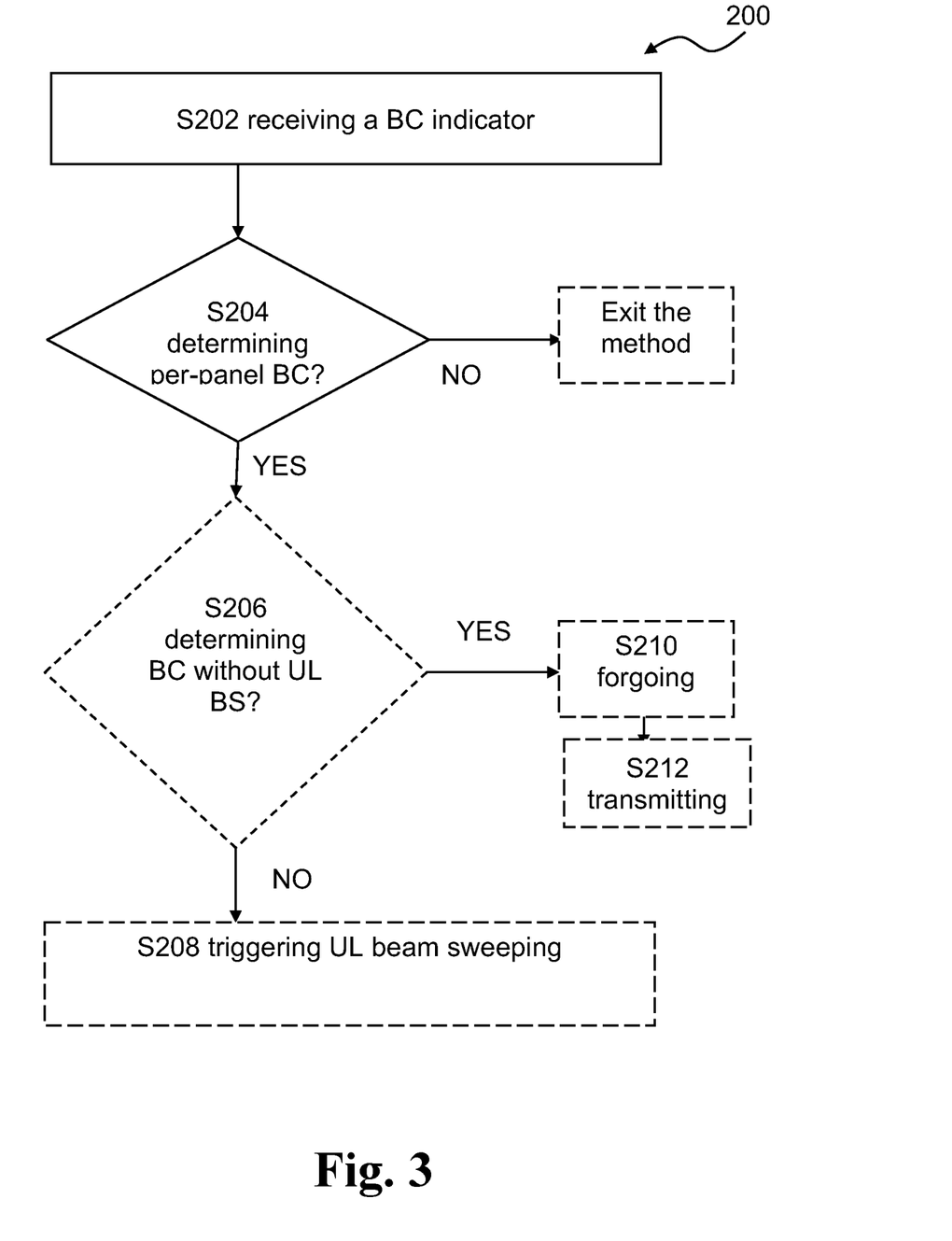
FIG. 3 is a flow-chart illustrating an exemplary method, performed in a network node of a wireless communication system, beam correspondence signalling with a wireless device according to this disclosure.

FIG. 3 shows a flow diagram of an example method 200, performed by a network node according to this disclosure. The method 200 is performed by a network node, for beam correspondence signalling. In one or more example methods, the network node is configured to communicate with a wireless device via a wireless communication system. The network node may comprise a plurality of antenna panels.

In one or more example methods, the method 200 comprises receiving S202 a beam correspondence, BC, capability indicator from the wireless device, the BC capability indicator comprising a BC capability parameter and a panel identifier.

In one or more example methods, the panel identifier is configured to identify an antenna panel of a plurality of antenna panels of the wireless device. The wireless device comprises the plurality of antenna panels.

In one or more example methods, the BC capability parameter is indicative of a beam correspondence capability for the antenna panel identified by the panel identifier.

In one or more example methods, the method 200 comprises determining S204 based on the BC capability indicator, if a per-panel beam correspondence is supported by the wireless device. A per-panel beam correspondence may refer the functionality supported by the wireless device to provide the beam correspondence parameter per antenna panel and thus enables the use of e.g. MIMO. A per-panel BC signalling may refer to the functionality disclosed herein where BC capability parameter is indicated for an identified antenna panel. In other words, determining, based on the BC capability indicator, if a per-panel beam correspondence signalling is supported by the wireless device comprises determining, based on the BC capability indicator, if a per-panel beam correspondence information is supported by the wireless device.

In one or more example methods, the method 200 comprises, when it is determined that the per-panel beam correspondence signalling is supported by the wireless device, determining S206 based on the BC capability parameter if a beam correspondence requirement without uplink beam sweeping is fulfilled by the antenna panel corresponding to the panel identifier.

In one or more example methods, the method 200 comprises, when it is determined that the beam correspondence requirement without uplink beam sweeping is not fulfilled by the antenna panel, triggering S208 uplink beam sweeping for the corresponding antenna panel.

In one or more example methods, the method 200 comprises, when it is determined that the beam correspondence capability is not supported by for the antenna panel, transmitting S212 using the beam correspondence indicated in the beam correspondence capability.

In one or more example methods, the method 200 comprises, when it is determined that the beam correspondence requirement without uplink beam sweeping is fulfilled by the antenna panel, forgoing S210 the uplink beam sweeping for the corresponding antenna panel and communicating with the wireless device according to the received BC capability indicator. Stated differently, when it is determined that the beam correspondence requirement without uplink beam sweeping is fulfilled by the antenna panel, the network node does request uplink beam sweeping for the corresponding antenna panel and communicates with the wireless device based on the received BC capability indicator. For example, for the antenna panel with the beam correspondence requirement fulfilled with uplink beam sweeping fulfilled, the network node sends a downlink reference signal (SSB or CSI-RS), and waits the wireless device to reply with an uplink beam. For the panel with the beam correspondence requirement fulfilled without uplink beam sweeping fulfilled, the network node indicates the UE to do an uplink beam sweeping and tell the UE which beam it should use for uplink transmission.

Figure 4:
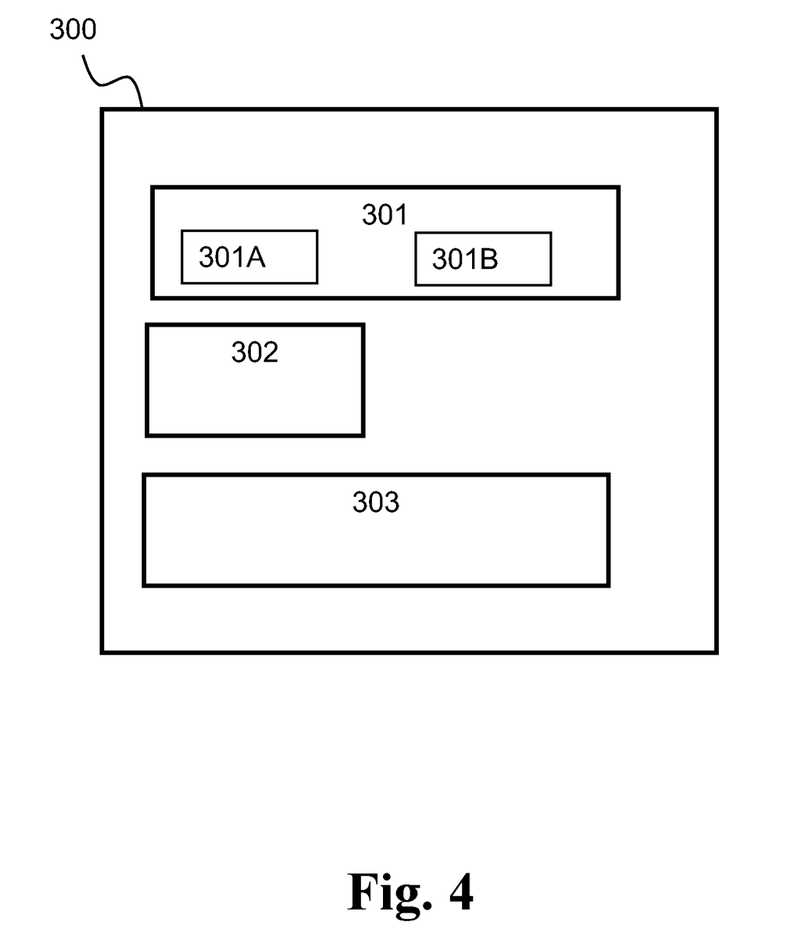
FIG. 4 is a block diagram illustrating an exemplary wireless device according to this disclosure.

FIG. 4 shows a block diagram of an example wireless device 300 according to the disclosure. The wireless device 300 comprises a wireless interface 301, a processor module 303, and a memory module 302. The wireless interface 301 comprises a plurality of antenna panels including a first antenna panel 301A and a second antenna panel 301B. The wireless device 300 may be configured to perform any of the methods disclosed in FIG. 2.

The wireless device 300 is configured to obtaining, for the first antenna panel, a first beam correspondence, BC, capability parameter associated with a first panel identifier.

The wireless interface 301 is configured to transmit to a network node a first BC capability indicator, wherein the first BC capability indicator comprises the first BC capability parameter and the first panel identifier.

The processor module 303 is optionally configured to perform any of the operations disclosed in FIG. 2. The operations of the wireless device 300 may be embodied in the form of executable logic routines (e.g., lines of code, software programs, etc.) that are stored on a non-transitory computer readable medium (e.g., the memory module 302) and are executed by the processor module 303).

Furthermore, the operations of the wireless device 300 may be considered a method that the wireless module is configured to carry out. Also, while the described functions and operations may be implemented in software, such functionality may as well be carried out via dedicated hardware or firmware, or some combination of hardware, firmware and/or software.

The memory module 302 may be one or more of a buffer, a flash memory, a hard drive, a removable media, a volatile memory, a non-volatile memory, a random access memory (RAM), or other suitable device. In a typical arrangement, the memory module 302 may include a non-volatile memory for long term data storage and a volatile memory that functions as system memory for the processor module 303. The memory module 302 may exchange data with the processor module 304 over a data bus. Control lines and an address bus between the memory module 302 and the processor module 303 also may be present (not shown in FIG. 3). The memory module 302 is considered a non-transitory computer readable medium.

Figure 5:
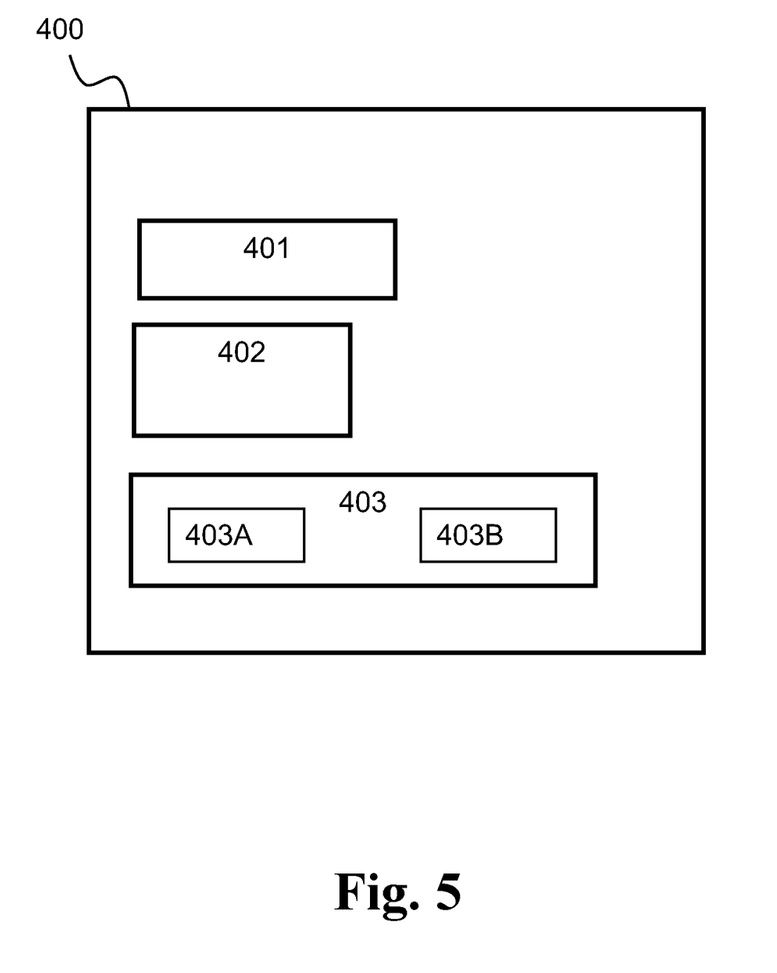
FIG. 5 is a block diagram illustrating an exemplary network node according to this disclosure.

FIG. 5 shows a block diagram of an exemplary network node 400 according to the disclosure. The network node 400 comprises a memory module 401, a processor module 402, and a wireless interface 403. The wireless interface 403 comprises a plurality of antenna panels 403a, 403B. The network node 400 may be configured to perform any of the methods disclosed in FIG. 3.

The network node 400 is configured to communicate with a wireless device, such as wireless device 300 disclosed herein, using a wireless communication system (as illustrated in FIG. 1). The wireless interface 403 is configured to communicate with the wireless device via a wireless communication system, such as a 3GPP system.

The network node 400 is configured to, via the wireless interface 403, receive a beam correspondence, BC, capability indicator from the wireless device, the BC capability indicator comprising a BC capability parameter and a panel identifier, wherein the panel identifier is configured to identify an antenna panel of a plurality of antenna panels of the wireless device, wherein the BC capability parameter is indicative of a beam correspondence capability for the antenna panel identified by the panel identifier.

The network node 400 is configured to, via the processor module 402, determine, based on the BC capability indicator, if a per-panel beam correspondence signalling is supported by the wireless device.

The processor module 402 is optionally configured to perform any of the operations disclosed in FIG. 3, e.g. S206, S208, S210, S212. The operations of the network node 400 may be embodied in the form of executable logic routines (e.g., lines of code, software programs, etc.) that are stored on a non-transitory computer readable medium (e.g., the memory module 401) and are executed by the processor module 402).

Furthermore, the operations of network node 400 may be considered a method that the wireless device is configured to carry out. Also, while the described functions and operations may be implemented in software, such functionality may as well be carried out via dedicated hardware or firmware, or some combination of hardware, firmware and/or software.

The memory module 401 may be one or more of a buffer, a flash memory, a hard drive, a removable media, a volatile memory, a non-volatile memory, a random access memory (RAM), or other suitable device. In a typical arrangement, the memory module 401 may include a non-volatile memory for long term data storage and a volatile memory that functions as system memory for the processor module 402. The memory module 401 may exchange data with the processor module 402 over a data bus. Control lines and an address bus between the memory module 401 and the processor module 402 also may be present (not shown in FIG. 5). The memory module 401 is considered a non-transitory computer readable medium.

Embodiments of methods and products (network node and wireless device) according to the disclosure are set out in the following items:

1. A method, performed by a wireless device, for beam correspondence signaling wherein the wireless device comprises a plurality of antenna panels including a first antenna panel, the method comprising:
   obtaining (S102), for the first antenna panel, a first beam correspondence, BC, capability parameter associated with a first panel identifier; and
   transmitting (S114) to a network node a first BC capability indicator, wherein the first BC capability indicator comprises the first BC capability parameter and the first panel identifier.

2. The method according to item 1, wherein obtaining (S102), for the first antenna panel, the first BC capability parameter associated with the first panel identifier comprises:
   obtaining (S103) the first panel identifier for the first antenna panel;
   determining (S104) the first BC capability parameter for the first antenna panel; and
   associating (S106) the first BC capability parameter with the first panel identifier.

3. The method according to any of the previous items, wherein the plurality of antenna panels includes a second antenna panel, the method comprising:
   obtaining (S107) for the second antenna panel, a second BC capability parameter associated with a second panel identifier; and
   transmitting (S115) to the network node a second BC capability indicator, wherein the second BC capability indicator comprises the second BC capability parameter and the second panel identifier.

4. The method according to any of the previous items, wherein transmitting (S114) the first BC capability indicator to the network node comprises:
   determining (S114A) one or more other panel capabilities for the first antenna panel;
   encoding (S114B), for the first antenna panel, the corresponding first BC capability indicator with the corresponding one or more other panel capabilities; and
   transmitting (S114C) the encoded corresponding first BC capability indicator to the network node.

5. The method according to item 4, wherein the one or more other panel capabilities comprise a multiple input multiple output, MIMO, capability indicating whether MIMO is supported.

6. The method according to any of items 3-5, wherein transmitting (S114) to the network node the first BC capability indicator comprises transmitting (S114F) to the network node one or more of: the first BC capability indicator and the second BC capability indicator through one or more resources for uplink reference signals.

7. A method, performed by a network node, for beam correspondence signaling, wherein the network node is configured to communicate with a wireless device via a wireless communication system, the method comprising:
   receiving (S202) a beam correspondence, BC, capability indicator from the wireless device, the BC capability indicator comprising a BC capability parameter and a panel identifier, wherein the panel identifier is configured to identify an antenna panel of a plurality of antenna panels of the wireless device, wherein the BC capability parameter is indicative of a BC capability for the antenna panel identified by the panel identifier; and
   determining (S204), based on the BC capability indicator, if a per-panel beam correspondence signaling is supported by the wireless device.

8. The method according to item 7, the method comprising:
   when it is determined that the per-panel beam correspondence signaling is supported by the wireless device, determining (S206) based on the BC capability parameter if a BC requirement without uplink beam sweeping is fulfilled by the antenna panel corresponding to the panel identifier.

9. The method according to item 8, the method comprising:
   when it is determined that the BC requirement without uplink beam sweeping is not fulfilled by the antenna panel, triggering (S208) uplink beam sweeping for the corresponding antenna panel.

10. The method according to any of items 8-9, the method comprising:
    when it is determined that the BC requirement without uplink beam sweeping is fulfilled by the antenna panel, forgoing (S210) the uplink beam sweeping for the corresponding antenna panel and communicating with the wireless device according to the received BC capability indicator.

11. A wireless device comprising an interface module, a memory module, and a processing module, wherein the wireless device is configured to perform any of the methods according to any of items 1-6.

12. A network node comprising an interface module, a memory module, and a processing module, wherein the wireless device is configured to perform any of the methods according to any of items 7-10.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-5 comprises some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. A method, performed by a wireless device, for beam correspondence signalling wherein the wireless device comprises a plurality of antenna panels including a first antenna panel, the method comprising:
   obtaining, for the first antenna panel, a first beam correspondence (BC) capability parameter associated with a first panel identifier; and
   transmitting to a network node a first BC capability indicator, wherein the first BC capability indicator comprises the first BC capability parameter and the first panel identifier, wherein transmitting the first BC capability indicator comprises:
      determining one or more other panel capabilities for the first antenna panel;
      encoding, for the first antenna panel, the corresponding first BC capability indicator with the corresponding one or more other panel capabilities; and
      transmitting the encoded corresponding first BC capability indicator to the network node.

2. The method according to claim 1, wherein obtaining, for the first antenna panel, the first BC capability parameter associated with the first panel identifier comprises:
   obtaining the first panel identifier for the first antenna panel;
   determining the first BC capability parameter for the first antenna panel; and
   associating the first BC capability parameter with the first panel identifier.

3. The method according claim 1, wherein the plurality of antenna panels includes a second antenna panel, the method comprising:
   obtaining for the second antenna panel, a second BC capability parameter associated with a second panel identifier; and
   transmitting to the network node a second BC capability indicator, wherein the second BC capability indicator comprises the second BC capability parameter and the second panel identifier.

4. The method according to claim 1, wherein the one or more other panel capabilities comprise a multiple input multiple output (MIMO) capability indicating whether MIMO is supported.

5. A method, performed by a wireless device, for beam correspondence signalling wherein the wireless device comprises a plurality of antenna panels including a first antenna panel and a second antenna panel, the method comprising:
   obtaining, for the first antenna panel, a first beam correspondence (BC) capability parameter associated with a first panel identifier;
   transmitting to a network node a first BC capability indicator, wherein the first BC capability indicator comprises the first BC capability parameter and the first panel identifier;
   obtaining for the second antenna panel, a second BC capability parameter associated with a second panel identifier; and
   transmitting to the network node a second BC capability indicator, wherein the second BC capability indicator comprises the second BC capability parameter and the second panel identifier,
   wherein transmitting to the network node the first BC capability indicator comprises transmitting to the network node one or more of: the first BC capability indicator and the second BC capability indicator through one or more resources for uplink reference signals.

6. A method, performed by a network node, for beam correspondence signalling, wherein the network node is configured to communicate with a wireless device via a wireless communication system, the method comprising:
   receiving a beam correspondence (BC) capability indicator from the wireless device, the BC capability indicator comprising a BC capability parameter and a panel identifier, wherein the panel identifier is configured to identify an antenna panel of a plurality of antenna panels of the wireless device, wherein the BC capability parameter is indicative of a BC capability for the antenna panel identified by the panel identifier;
   determining, based on the BC capability indicator, if a per-panel beam correspondence signalling is supported by the wireless device; and when it is determined that the per-panel beam correspondence signalling is supported by the wireless device, determining based on the BC capability parameter if a BC requirement without uplink beam sweeping is fulfilled by the antenna panel corresponding to the panel identifier.

7. The method according to claim 6, the method comprising:
when it is determined that the BC requirement without uplink beam sweeping is not fulfilled by the antenna panel, triggering uplink beam sweeping for the corresponding antenna panel.

8. The method according to claim 6, the method comprising:
when it is determined that the BC requirement without uplink beam sweeping is fulfilled by the antenna panel, forgoing the uplink beam sweeping for the corresponding antenna panel and communicating with the wireless device according to the received BC capability indicator.

9. A wireless device comprising an interface module, a memory module, and a processing module, wherein the wireless device is configured to perform the method of claim 1.

10. A network node comprising an interface module, a memory module, and a processing module, wherein the wireless device is configured to perform the method of claim 6.

* * * * *